US011709088B1

(12) United States Patent
Dudar

(10) Patent No.: US 11,709,088 B1
(45) Date of Patent: Jul. 25, 2023

(54) VEHICLE FLUID-LEVEL SENSOR WITH ARTICULATING JOINT AND SENSOR

(71) Applicant: FORD GLOBAL TECHNOLOGIES, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/733,008

(22) Filed: Apr. 29, 2022

(51) Int. Cl.
*G01F 23/36* (2006.01)
*G01D 21/02* (2006.01)
*B60K 15/03* (2006.01)
*G01F 23/80* (2022.01)
*G01F 1/002* (2022.01)

(52) U.S. Cl.
CPC .............. *G01F 23/36* (2013.01); *B60K 15/03* (2013.01); *G01D 21/02* (2013.01); *G01F 1/005* (2013.01); *G01F 23/804* (2022.01); *B60K 2015/03223* (2013.01)

(58) Field of Classification Search
CPC ........ G01F 23/36; G01F 23/804; G01F 1/005; B60K 15/03; B60K 2015/03223; G01D 21/02
See application file for complete search history.

(56) References Cited

U.S. PATENT DOCUMENTS

| | | | | |
|---|---|---|---|---|
| 5,284,055 A | * | 2/1994 | Baux | G01F 23/36 73/317 |
| 5,743,136 A | * | 4/1998 | Gaston | H01C 10/305 73/313 |
| 2017/0307432 A1 | * | 10/2017 | Fuller | G01F 1/38 |
| 2018/0172498 A1 | * | 6/2018 | Hanby | G01F 23/363 |

FOREIGN PATENT DOCUMENTS

| | | | | |
|---|---|---|---|---|
| DE | 19951342 A1 | * | 4/2001 | ............ F17C 13/021 |
| EP | 3569991 A1 | * | 11/2019 | ............ G01F 23/36 |
| GB | 154911 A | | 4/1922 | |

* cited by examiner

*Primary Examiner* — Jamel E Williams
(74) *Attorney, Agent, or Firm* — Vincent Mastrogiacomo; Brooks Kushman P.C.

(57) ABSTRACT

A float assembly of a fluid-level sensor includes a float and an arm assembly. The arm assembly has a first attachment portion connectable to a fluid-level sensor and a second attachment portion connected to the float. The arm assembly further has an articulating joint that permits relative movement between the float and the first attachment portion. A sensor attached to the float.

20 Claims, 3 Drawing Sheets

US 11,709,088 B1

VEHICLE FLUID-LEVEL SENSOR WITH ARTICULATING JOINT AND SENSOR

TECHNICAL FIELD

The present disclosure relates to fluid-level sensors for gauging an amount of fuel within an automotive fuel tank.

BACKGROUND

Automobiles may include internal-combustion engines that convert liquid fuel, such as gasoline or diesel, into mechanical power via combustion. These vehicles include a fuel tank that stores the liquid fuel. Within the fuel tank is a fluid-level sensor configured to measure the amount of fuel within the tank. The fluid-level sensor may be in communication with a controller that is configured to interpret the sensor reading into a percentage of remaining fuel. A gauge may be provided within an interior of the vehicle and configured to display the percentage of fuel within the fuel tank.

SUMMARY

According one embodiment, a fluid-level sensor includes a housing, a first sensor supported by the housing, and a float assembly pivotally connected to the housing. The first sensor is configured to sense inputs from the float assembly and output a signal indicative of a fluid level. The float assembly includes a float, a first portion connected to the float, a second portion pivotally connected to the housing, and a joint having first and second components that are articulatable relative to each other. The first component is attached to the first portion and the second component is attached to the second portion. A second sensor is configured to sense relative movement between the float and the second component and output a signal indicative of fluid flow.

According to another embodiment, a float assembly of a fluid-level sensor includes a float and an arm assembly. The arm assembly has a first attachment portion connectable to a fluid-level sensor and a second attachment portion connected to the float. The arm assembly further has an articulating joint that permits relative movement between the float and the first attachment portion. A sensor attached to the float.

According to yet another embodiment, a fluid-level sensor includes a housing, a first sensor supported by the housing, and a float assembly pivotally connected to the housing. The first sensor is configured to read inputs from the float assembly and output a signal indicative of a fluid level. The float assembly further includes a float, a first arm connected to the float, a second arm pivotally connected to the housing, and a hinge having first and second components that are pivotal relative to each other. The first component is attached to the first portion and the second component is attached to the second portion. A second sensor is configured to sense relative movement between the first and second components and output a signal indicative of fluid movement.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A vehicle fuel tank may include one or more passive valves, e.g., GVV and FLVV to regulate petroleum fumes in conjunction with an evaporative emission system of the engine. The vehicle may perform routine diagnostic testing of the evaporative emission system to ensure proper operation of the one or more valves and other components/systems associated with the fuel tank. These diagnostics can be affected by excessive fluid flow within the fuel tank. For example, the splashing and sloshing of the fuel within the tank due to vehicle maneuvering may affect the accuracy of the diagnostic testing.

Described herein is a vehicle fluid-level sensor configured to sense excessive fluid flow so that diagnostic testing is not performed under nonideal conditions. That is, the fluid-level sensor includes a first sensor for gauging the fuel level and a second sensor for determining whether or not conditions are suitable for diagnostics.

Figure 1:
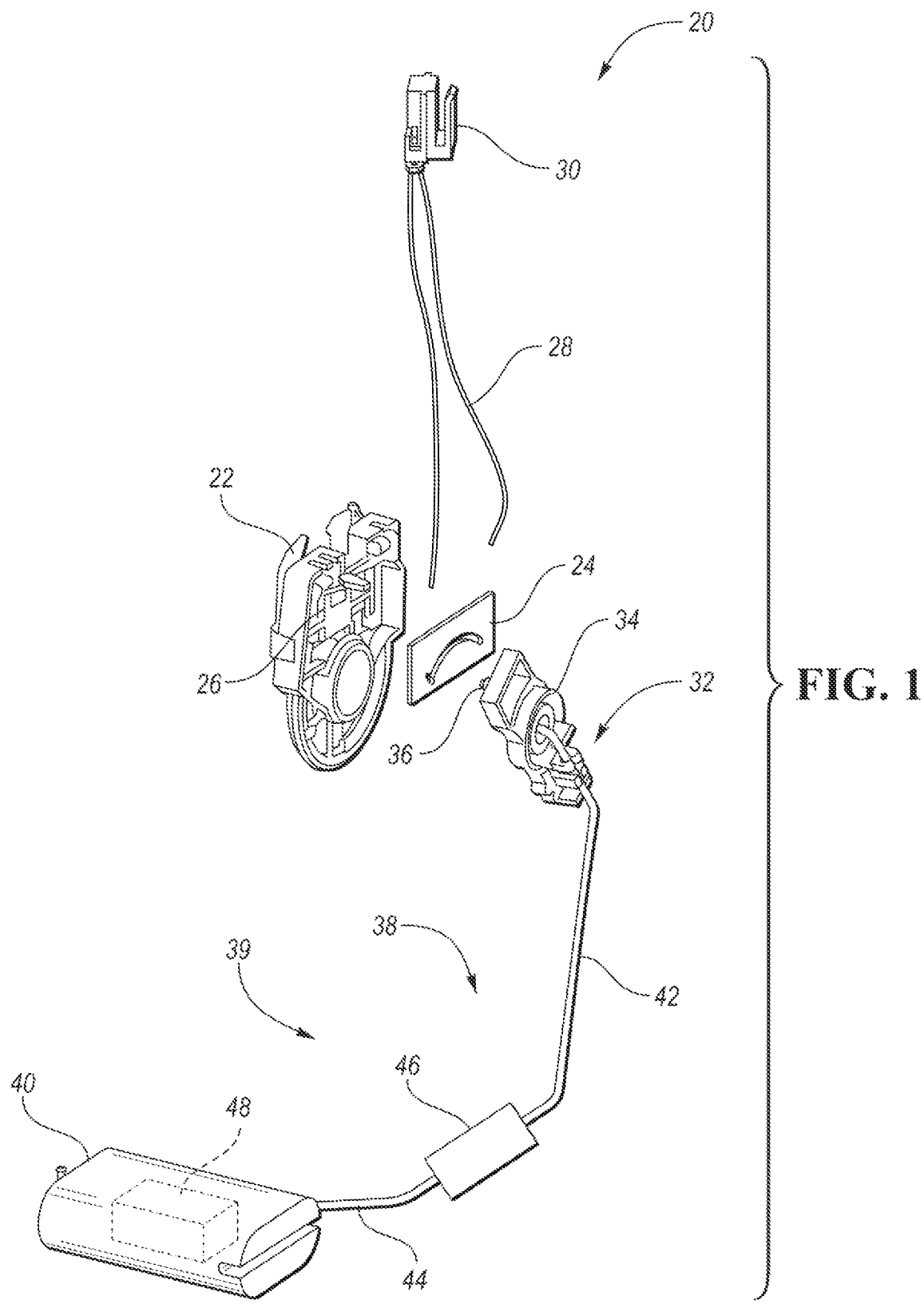
FIG. 1 illustrates an exploded view of a fluid-level sensor.

Referring to FIG. 1, a fluid-level sensor 20 is configured to be disposed within a fuel tank. The sensor 20 includes a housing 22 configured to be fixed within the fuel tank. The housing 22 supports a resistor element that includes a card 24, which may be in the form of a ceramic card or other electrically insulative material. The housing 22 may include features 26 that hold the ceramic card 24. The ceramic card 24 has electrically conductive traces disposed on a backside of the card. The traces may be printed on the card. The electrically conductive traces are electrically connected to wires 28 that attach with a sensor connector 30.

A wiper assembly 32 is pivotally connected to the housing and includes a wiper 36. The wiper 36, i.e., an electrical contact, engages with the traces of the ceramic card 24. The wiper 36 and the card 24 may be referred to as a sensor that senses rotation of a wiper arm 34 relative to the housing 22 and outputs a signal indicative of a fluid level within the fuel tank. In one or more embodiments, rotation of the wiper arm 34, responsive to changes in fluid level, causes the wiper 36 to sweep across the traces thus changing a resistance of the circuit to produce a readable signal indicative of fuel level. This may be sent to a vehicle controller, which may relay the data to a display or gage to show the driver a fuel reading.

The wiper arm 34 is mechanically connected with a float assembly 39 that includes a float 40 and a connecting element 38. The float 40 is buoyant relative to the fuel and moves up and down with the fuel level. The up-and-down movement of the float 40 rotates the arm 34 and thus slides the wiper 36 relative to the traces to output different resistances interpretable as fuel-level readings.

The connecting element 38 may include one or more arms, which may be attached by an articulation mechanism or joint. For example, the connecting element 38 may include a first arm 42 that is attached to the wiper arm 34 at a first end and attached to a joint 46 at a second end. A second arm 44 is attached to the float 40 at a first end and to the joint 46 at a second end. The joint 46 connects the first and second arms 42, 44 while allowing articulation between the arms. The joint 46 may include a first component attached to the first arm 42 and a second component 44 attached to the second arm. The first and second components of the joint 46 are articulate about relative to each other. The joint 46 allows the float 40 to move relative to the first arm 42 in one or more directions.

A second sensor 48 may be supported by the float 40 and is movable relative to the wiper arm 34 via the articulating joint 46. The second sensor 48 may be attached to or disposed within the float 40. Alternatively, the sensor 48 may be connected to the arm 44. The second sensor 48 is not used to gauge fuel level and instead is used to sense the flow of fluid within the tank. For example, the sensor 48 is used to sense sloshing, splashing, transverse waves, longitudinal waves, or the like (herein referred to generally as disturbances) of the fuel within the tank. The sensor 48 may be in electric communication with the vehicle controller. The sensor 48 may be connected to the connector 30, have an additional connector, or may be wireless.

Figure 2:
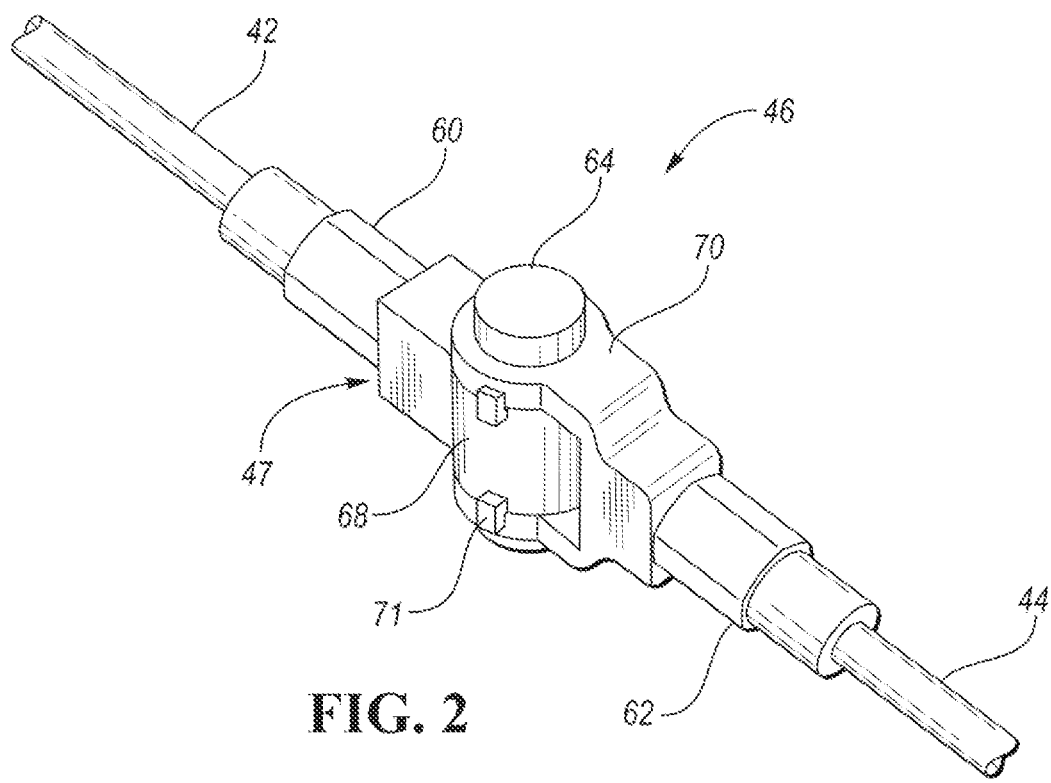
FIG. 2 illustrates a perspective view of an example joint of the fluid-level sensor according to one or more embodiments.

FIG. 2 illustrates one example embodiment of the joint 46. Here, the joint 46 is a hinge 47 having a first component 60, a second component 62, and a pin 64 that pivotally connects the first and second components about a pivot axis that extends through a center of the pin 64. The hinge 47 allows the float 40, which is attached to the second component 62, to move relative to the remaining assembly about the pin 64. The first component 60 may include a cylindrical barrel 68 that defines a hole configured to receive the pin 64. The second component 62 may include a pair of loops 70 that define holes configured to receive the pin 64. The holes of the loops 70 may be substantially the same size as the holes of the barrel 68, which may both approximate the diameter of the pin 64, albeit slightly larger to allow assembly and provide clearance for tolerances and movement. The joint 46 may include one or more stops 71 that limit travel between the first and second components 60, 62. The hinge 47 may also include a friction element(s), such as washers, that resist pivoting of the hinge so that the float only moves and triggers the second sensor when excessive disturbances are present within the fuel tank.

The hinge 47 may be oriented within the fuel tank in whichever direction is most likely to detect fluid disturbances. For example, if the fuel tank is oblong, the hinge may be arranged so that waves traveling in the longitudinal direction of the tank pivot the float about the joint 46.

The hinge 47 may include a biasing mechanism that returns the first component 60 and the second component 62 to a resting position once the disturbances subside. The resting position may be position in which the arms 42 and 44 are coplanar or may be any other orientation that is suitable. The biasing mechanism is an optional feature. It may not be necessary for the joint 46 to return to a resting position in order to sense excessive disturbances within the fuel tank. If a biasing mechanism is provided, a spring, such as a clock spring, is one example.

Figure 3:
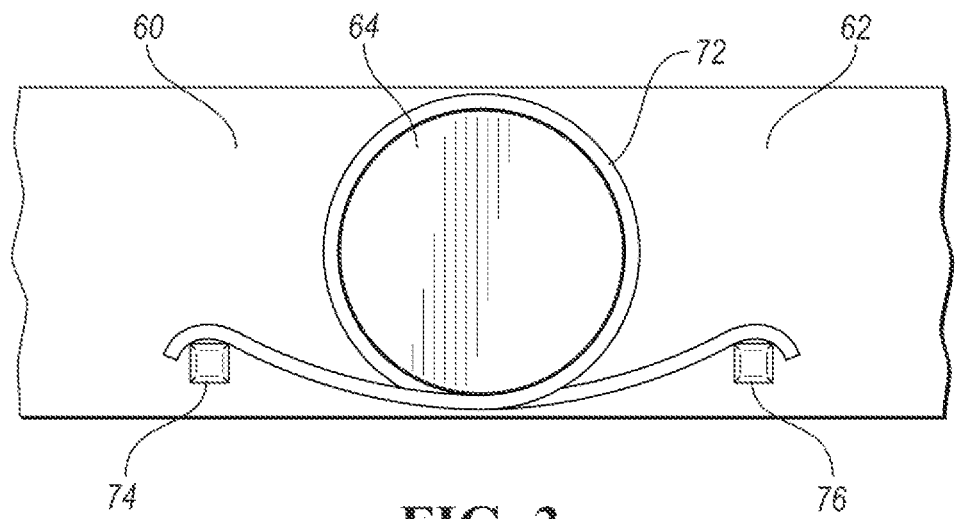
FIG. 3 illustrates a top view of the joint of according to one or more embodiments.

FIG. 3 illustrates an example spring 72 that may be used to bias the joint 46. The spring 72 may include a first end that is attached to an attachment feature 74 of the first component 60 and a second end that is connected to an attachment feature 76 of the second component 62. The spring 72 is configured to bias the first and second component 60 and 62 to the resting position shown in FIG. 2. During operation, a disturbance may pivot component 62 relative to the component 60 and compress the spring 72. Once the disturbance subsides, the spring 72 returns the joint to the resting position.

Figure 4:
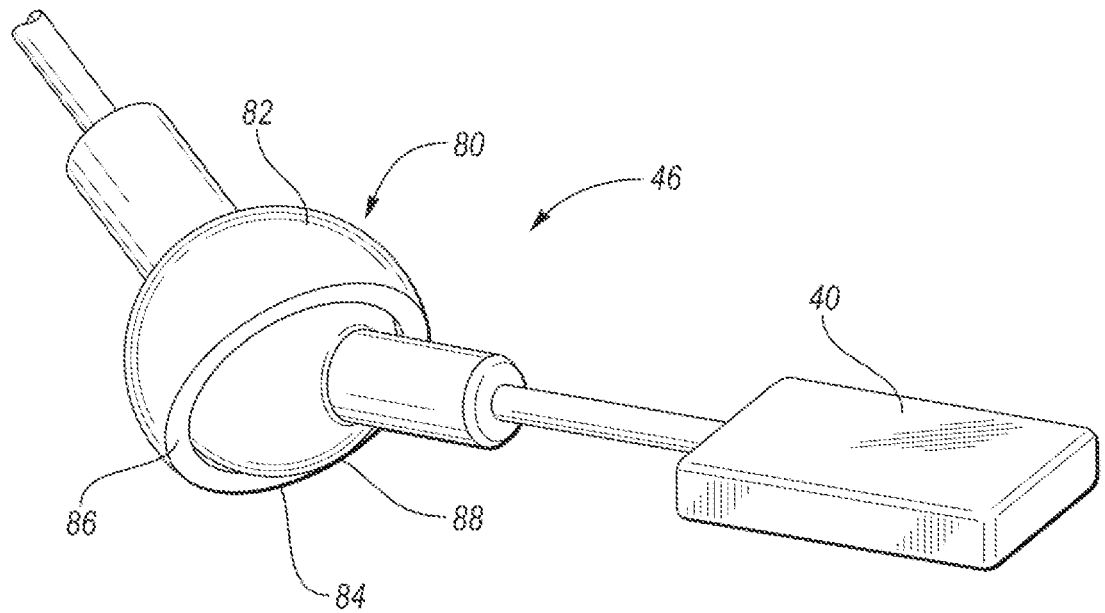
FIG. 4 illustrates a perspective view of another example joint according to one or more alternative embodiments.

Referring to FIG. 4, the joint 46 may also include multiple degrees of movement rather than just one degree of movement as described above in the hinge embodiment. Here, the joint 46 may be universal joint 80 that allows for multiple directions of movement. Using the joint 80, for example, the sensor may sense both left-and-right, up-and-down, diagonal, and torsion fluid disturbances. The universal joint 80 may include a first component 82 and a second component 84 that are connected for movement therebetween. For example, the first component 82 may define socket 86 that receives a ball 88, e.g., a ball-and-socket joint. The clearances between the ball 88 and the socket 86, materials used, or both can be tuned to increase or decrease the resistance of the joint 80 to articulation.

Figure 5:
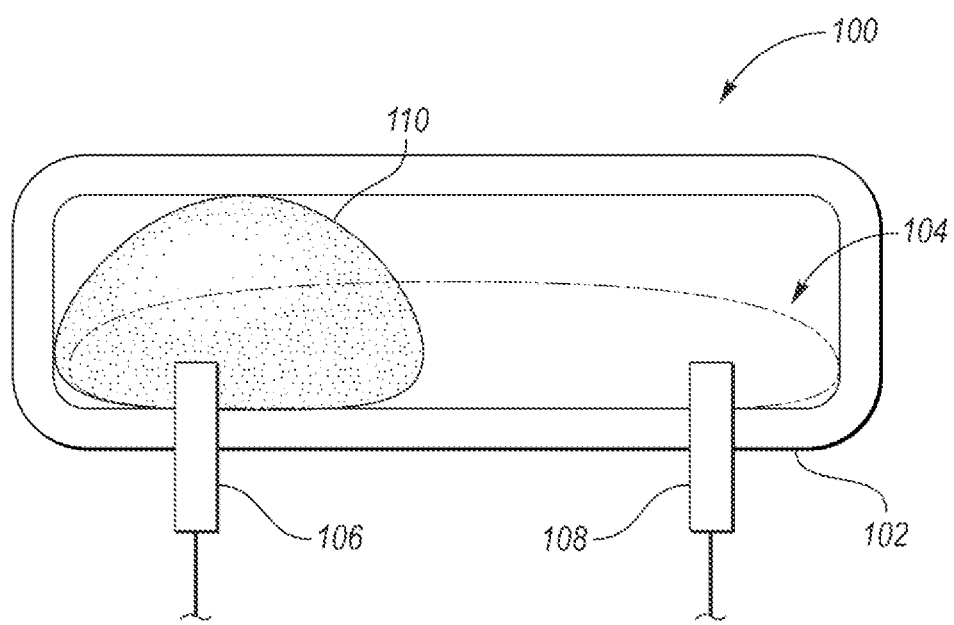
FIG. 5 illustrates an example sensor for use with the fluid-level sensor.

The second sensor 48 may be any sensor configured to sense movement of the float 40 relative to the wiper arm 34 or sense movement between the components on opposite sides of the joint 46. The sensor 48 may be an inertia switch that senses movement of the float due to disturbances. FIG. 5 illustrates an example mercury switch 100. The switch 100 includes a housing 102 defining an interior 104. A pair of electrical contacts 106, 108 extend into the interior 104. The contacts 106, 108 are spaced apart from each other and are configured to be electrically connected by a mercury fluid 110. The mercury 110 is designed to normally only contact one of the contacts creating a normally open circuit condition. Force acting on the switch 100 causes the mercury 110 to flow into contact with the contact 108 thus closing the electric circuit and outputting a signal from the sensor 100. In the context of this invention, fluid disturbances within the fuel tank move the float 40 about the joint 46 causing the mercury 110 to close the switch 100 and thus outputting a signal from the sensor 48 that is interpretable by the vehicle controller. In response to receiving this signal from the mercury switch 100, diagnostics may be ceased as conditions are not conducive to accurate readings. The mercury switch 100 is but one example embodiment for the second sensor 48 and other types of switches or sensors may be used. For example, the sensor may be an accelerometer.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A fluid-level sensor comprising:
    a housing;
    a first sensor supported by the housing; and
    a float assembly pivotally connected to the housing, wherein the first sensor is configured to sense inputs from the float assembly and output a signal indicative of a fluid level, wherein the float assembly further includes:
        a float,
        a first portion connected to the float,
        a second portion pivotally connected to the housing,
        a joint having first and second components that are articulatable relative to each other, the first component being attached to the first portion and the second component being attached to the second portion, and
        a second sensor configured to sense relative movement between the float and the second component and output a signal indicative of fluid flow.

2. The fluid-level sensor of claim 1, wherein the first and second components are biased to a first position relative to each other.

3. The fluid-level sensor of claim 2 further comprising a resilient member configured to bias the first and second components to the first position.

4. The fluid-level sensor of claim 1, wherein the joint includes a stop arranged to limit movement between the first and second components.

5. The fluid-level sensor of claim 1 wherein the second sensor is configured to output the signal responsive to the relative movement between the first and second components.

6. The fluid-level sensor of claim 1, wherein the first and second components are pivotally attached.

7. The fluid-level sensor of claim 6, wherein the joint includes a pin extending through the first and second components.

8. The fluid-level sensor of claim 1, wherein the first portion is a first arm and the second portion is a second arm.

9. The fluid-level sensor of claim 1, wherein the second sensor is an inertia sensor.

10. The fluid-level sensor of claim 9, wherein the sensor includes a pair of electrical contacts and mercury configured to complete a circuit between the contacts.

11. The fluid-level sensor of claim 1, wherein the second sensor is supported by the float.

12. The fluid-level sensor of claim 11, wherein the second sensor is disposed in the float.

13. The fluid-level sensor of claim 1, wherein the first component defines a socket, and the second component has a ball received in the socket.

14. A float assembly of a fluid-level sensor comprising:
    a float;
    an arm assembly having a first attachment portion connectable to a fluid-level sensor and a second attachment portion connected to the float, the arm assembly including an articulating joint that permits relative movement between the float and the first attachment portion; and
    a sensor attached to the float.

15. The float assembly of claim 14, wherein the sensor is an inertia sensor.

16. The float assembly of claim 14, wherein the sensor is disposed within the float.

17. The float assembly of claim 14, wherein the sensor is directly attached to the float.

18. The float assembly of claim 14, wherein the arm assembly further includes a first arm and a second arm pivotally connected by the articulating joint.

19. The float assembly of claim 18, wherein the joint includes a pin forming a pivot axis of the relative movement.

20. A fluid-level sensor comprising:
    a housing;
    a first sensor supported by the housing; and
    a float assembly pivotally connected to the housing, wherein the first sensor is configured to read inputs from the float assembly and output a signal indicative of a fluid level, wherein the float assembly further includes:
        a float,
        a first arm connected to the float,
        a second arm pivotally connected to the housing,
        a hinge having first and second components that are pivotal relative to each other, the first component being attached to the first portion and the second component being attached to the second portion, and
        a second sensor configured to sense relative movement between the first and second components and output a signal indicative of fluid movement.

* * * * *